UNITED STATES PATENT OFFICE.

VICTOR MORITZ GOLDSCHMIDT, OF CHRISTIANIA, NORWAY, ASSIGNOR TO TITAN CO. A/S. OF NORWAY, OF CHRISTIANIA, NORWAY.

PROCESS OF FREEING LIQUIDS FROM SUSPENDED PARTICLES.

1,276,644.  Specification of Letters Patent.  Patented Aug. 20, 1918.

No Drawing.   Application filed January 31, 1918.  Serial No. 214,706.

*To all whom it may concern:*

Be it known that I, VICTOR MORITZ GOLDSCHMIDT, a subject of Norway, and a resident of Christiania, Kingdom of Norway, have invented certain new and useful Improvements in Processes of Freeing Liquids from Suspended Particles, of which the following is a specification.

This invention relates to slimes, thereby meaning finely divided solid particles suspended in a liquid, such as are formed in many chemical processes of manufacture, for example by the dissolution of minerals or mineral products which contain insoluble or practically insoluble substances. Such substances will, if they occur in a finely divided state, become suspended in the resulting solution in the form of slimes.

The object of the invention is a method whereby such solid particles may be easily removed from the liquid in which they are suspended. Without a special treatment this is not easily accomplished. The greater the fineness of the particles the greater is the difficulty of removing them. When the individual particles of the slimes are as small as 0.001 millimeter in diameter or smaller, and especially if the solution in which they are suspended is of high concentration it will be almost impossible to remove the solid particles in the usual manner by settling, filtration or centrifugal separation. Even the finest filters will clog and will within a short time be rendered useless. If a settling process is employed it will, on account of the comparatively low specific gravity of the solid particles and their small size and because of the great internal friction of the solution, either require a very long time or it will not afford a sufficiently clear solution.

Many circumstances indicate that the presence of extremely fine colloidal particles makes the settling of the slimes especially difficult. Such particles will require a very long time for settling if the settling is not altogether prevented on account of the Brownian movement; they will also tend to increase the internal friction of the solution and thereby retard the settling also of comparatively large particles. The same difficulties will arise when using a centrifugal separation.

My invention comprises a method of facilitating the separation of such solid particles as above referred to from the liquid or solution in which they are suspended.

I have found that when I effect a precipitation of sulfur in a finely divided state in the suspension to be treated, the character of the slimes is materially altered. After such a precipitation has taken place the solid particles may without difficulty be separated from the liquid by means of settling, filtration or centrifugal separation. This phenomenon may be explained in several ways. The particles of the slimes may be enveloped by the precipitated sulfur and will thereby lose the properties which prevent a separation from the liquid. Another factor which may be of importance to the process is the colloidal character of the slimes and sulfur, colloidal sulfur is an electronegative colloid, and the solid particles of the slimes, generally consisting principally of silicon-hydrate-particles, are electropositive colloids, when suspended in a strong acid solution. It is probable that in this case the effect of the sulfur consists in causing a mutual coagulation of the electronegative colloidal sulfur and the electropositive silicon-hydrate.

To carry out my process I proceed as follows:

The solution to be treated for example has a specific gravity of 1.5 and contains ferrous sulfate, ferric sulfate, titanium sulfate and other sulfates. The solution also contains solids in suspension consisting principally or partly of finely divided silicon-hydrate-particles which can only be separated with great difficulty from the solution. To this solution I add hydrogen-sulfid either in the form of a gas or in the form of sulfids which react with the acid present forming $H_2S$. Due to the oxidizing agent present, in this case ferric sulfate, the $H_2S$ will soon become oxidized, whereby sulfur is precipitated. If no oxidizing agent is present I add for instance nitric acid, nitrates, chlorin or chlorates.

As the oxidizing agent is present in a dissolved condition the precipitation of sulfur will take place all over the solution and the sulfur will be able to act upon all suspended particles present.

I can carry out my treatment at different temperatures and also at different pressures, but I prefer to make no special arrangement for increased or reduced pressure and to keep the temperature at 30°–50° C. in order to prevent crystallization of my concentrated solution. After the precipitation of sulfur has taken place I remove the solid particles from the solution in well known manner such as by settling, filtration or centrifugal separation.

I have found that when working with the above mentioned solution containing originally about 20 grams of solid particles per liter an addition of $H_2S$ corresponding to 0.5 grams of sulfur per liter gives satisfactory results. I can then by settling reduce the contents of solid particles to 0.1 grams per liter. Without the treatment with sulfur I can only bring the contents of solid particles down to 5–10 grams per liter by settling.

As the object of my invention is a treatment of slimes with finely divided sulfur it will be understood that the precipitation of sulfur may be effected in many ways and above example is given for illustration only and shall mean no limitation of my invention.

What I claim as new and desire to secure by Letters Patent of the United States is:

1. Process of freeing a liquid from therein suspended solid particles which consists in precipitating sulfur in the liquid and removing said solid particles.

2. Process of freeing a liquid from therein suspended solid particles, which consists in precipitating sulfur in the liquid, the sulfur enveloping said solid particles, and removing said solid particles.

3. Process of freeing a liquid from therein suspended solid particles comprising electropositive colloidal silicon-hydrate-particles, which consists in precipitating sulfur comprising electronegative colloidal sulfur particles in the liquid, the sulfur enveloping said suspended particles and causing a mutual coagulation of the electropositive and the electronegative colloids present, and removing the solid particles.

4. Process of freeing a liquid from therein suspended solid particles, which consists in precipitating sulfur in the liquid, said precipitation being accomplished by oxidation of hydrogen-sulfid, and removing the solid particles.

5. Process of freeing a liquid from therein suspended solid particles, which consists in precipitating sulfur in the liquid, said precipitation being accomplished by oxidation of hydrogen-sulfid by means of ferric salt, and removing the solid particles.

6. Process of freeing a liquid from therein suspended solid particles, which consists in precipitating sulfur in the liquid, said precipitation being accomplished by oxidation of hydrogen sulfid by means of ferric sulphate, and removing the solid particles.

7. Process of freeing a liquid comprising a solution from therein suspended solid particles, which consists in precipitating sulfur in the liquid and removing said solid particles.

8. Process of freeing a liquid comprising a solution of an iron salt and also a titanium salt from therein suspended solid particles, which consists in precipitating sulfur in the liquid and removing said solid particles.

9. Process of freeing a liquid comprising iron sulfate and also titanium sulfate from therein suspended solid particles, which consists in precipitating sulfur in the liquid and removing said solid particles.

10. Process of freeing a liquid comprising iron sulfate and also titanium sulfate from therein suspended solid particles, which consists in precipitating sulfur in the liquid and removing said solid particles by filtration.

Signed at Christiana, Norway, this third day of December 1917.

VICTOR MORITZ GOLDSCHMIDT.